Nov. 22, 1932.    K. E. PEILER    1,888,963

GLASS FEEDING METHOD AND APPARATUS

Original Filed Dec. 4, 1916

Witness:
S. S. Grotta

Inventor:
Karl E. Peiler
by [signature]
Atty.

Patented Nov. 22, 1932

1,888,963

UNITED STATES PATENT OFFICE

KARL E. PEILER, OF WEST HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

GLASS FEEDING METHOD AND APPARATUS

Application filed December 4, 1916, Serial No. 134,828. Renewed October 12, 1929.

This invention relates to the feeding of molten glass from a furnace or other container, in regulated masses or gathers.

The object of the invention is to provide an improved simple and effective method and apparatus which operate in a novel manner to accumulate, form and deliver in a regular succession mold charges of the glass in the desired uniformity of time, size and working condition for further manipulation.

In the embodiment of the invention herein illustrated this object is attained by providing the forehearth of a melting furnace with a discharge outlet below the surface level of the glass, in connection with a gather forming implement which protrudes through and beyond the outlet, flowing the glass through the outlet along the implement to accumulate at the end thereof while the latter is in its most protruded position, then drawing back the end of the implement to and preferably into the outlet, thus partly withdrawing the support of the implement, and arresting or retarding the further flow of the glass through the outlet, thereby allowing the accumulated glass to sag, and causing it to change its shape and to form a depending gather suspended partly from the end of the implement and partly from the edge of the outlet, whereupon the gather is severed just below the implement by the severing mechanism to separate a mold charge. This method is preferably practiced in connection with a chamber surrounding the outlet and preferably surrounding the entire forehearth as herein shown, the gather of glass being thus accumulated in a hot chamber which protects the gather from being chilled, maintains it in approximately uniform temperature condition, and reheats the chill or shear mark left on the glass above the shears after severing.

Figure 1:
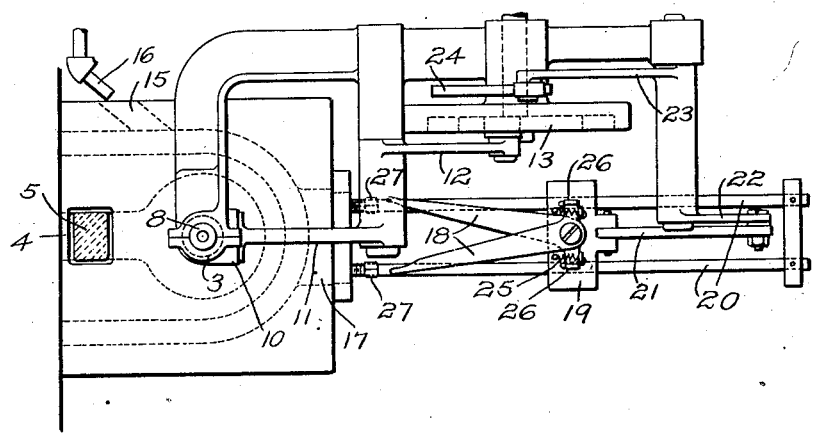
Figure 3:
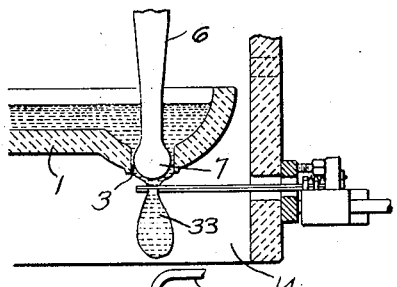
Figure 2:
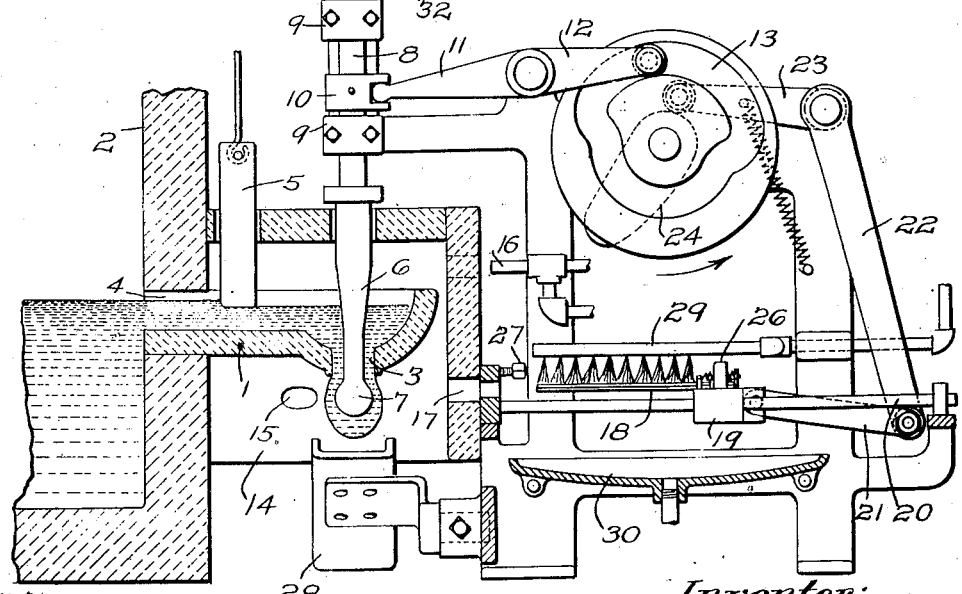

Figure 1 of the drawing is a plan view of the particular form of mechanism chosen to illustrate the invention. Fig. 2 is a side elevation of the same with the walls of the furnace and forehearth shown in vertical section, and with the implement in its lowest or gather accumulating position. Fig. 3 is a sectional view of the forehearth with the implement in its highest or shedding position and the shears in the act of cutting off a ball or mold charge of the glass.

The forehearth 1 extends outwardly from the wall 2 of the furnace, and through the bottom near the outer end of the forehearth is a discharge outlet 3. The molten glass flows from the furnace through the opening 4 into the forehearth and the surface level of the glass in the forehearth depends upon the degree of fluidity of the glass and the position of the regulating gate 5 which is in front of the outlet from the furnace.

In the form of apparatus illustrated a gather forming implement 6; herein, for conciseness, also designated as a gatherer with an enlarged head 7 is arranged to be reciprocated vertically between the positions shown in Figs. 2 and 3. This gatherer is made of refractory material and preferably is hollow so that it may be cooled, by air through a pipe 32. The stem 8 of the gatherer slides in suitable bearings 9 and has a collar 10 that is engaged by the end of an arm 11 which is rocked at the desired time by an arm 12 oscillated by the cam 13.

In its upper position the head of the impeller closes the discharge outlet in the forehearth sufficiently to arrest or at least retard the free downward flow of the glass.

As the gatherer moves downwardly it carries downwardly the glass around it, thus aiding the discharge, which continues while the gatherer is in its lowest position (Fig. 2), the timing and the size of the flow space being adapted to the amount of glass required for a gather. When the impeller is raised the accumulated glass on the sides of the head is stripped or shed therefrom, and becomes suspended from the impeller as a depending ball 30.

The outlet 3 of the forehearth is surrounded by a chamber 14 having walls of refractory material, which are here shown as also enclosing the entire forehearth. The chamber may be heated to the desired temperature by gas flames blown through openings 15 in the walls of the chamber from burners 16 arranged as may be required. By these means the glass in the forehearth as well as that which flows from the discharge outlet may be kept heated to the necessary degree to give it the desired consistency. The heat of the chamber also serves to reheat and eliminate the shear mark caused by severing.

The gathers when formed are severed by means of shear blades 18, movable into and out of the chamber through an opening 17 in the front wall. These blades are pivotally mounted on a block or carrier 19 that slides upon ways 20. The shear block is connected by a link 21 with the lower end of an arm 22 that is rocked by a cam arm 23 which is oscillated at the required time by a cam 24. The shear blades are normally held open by springs 25 and they have near their pivot upwardly extending lugs 26. When the blades are moved into the heating chamber these lugs collide with stops 27, in the form of adjustable screw studs, in such manner that the blades are closed together against the pull of the springs 25. The mechanisms are so timed that the shear blades are closed at the proper moment to sever a mold charge or gob from the accumulated gather of glass below the lower end of the implement when the latter is in its upper position (Fig. 3). The mold charges may fall directly into molds, or may fall upon a chute 28, at the bottom of the chamber beneath the discharge outlet, or may be delivered to other means for receiving and conducting them away. A sprayer 29 connected with a water supply is arranged to spray water upon the shears in order to cool them quickly when they are drawn out, and a drip pan 30 is arranged beneath the sprayer to collect and conduct away the sprayed water.

After the shears have closed and severed the mold charge from the gather, the stub of glass remaining above the shears is supported by the implement, which also retards the further discharge of glass. This keeps the glass from piling up on the shears while they are closed, minimizing the heating of the shears and the chilling of the stub. It thus avoids the formation of a flat chilled stub and allows a fresh start for the following gather, forming a smoothly rounded end on it.

By means of this method and as a result of the action of the apparatus described accurately sized and compactly formed mold charges of glass in the most desirable condition for subsequent use may be quickly accumulated, separated and conducted away.

The dimensions of the discharge outlet and the gatherer should be proportioned to the size of the gathers to be made, taking into account also the desired rapidity of the operations, so that sufficient glass to form the desired size of gather will flow during the time which may be apportioned to the flowing action. It is not essential to have the gatherer fit the outlet closely in order to stop the discharge of the glass, the viscosity of which enables a loosely fitting gatherer to be employed, which is desirable on account of the friable character of the refractory material best suited for this purpose, and the consequent difficulty of making and maintaining gatherers and outlet passages of any exact size, so as to fit each other closely. Although considered desirable, it is not essential that the head of the gatherer shall be drawn entirely into the outlet. It may be permissible and even desirable in some cases to employ an impeller having a head larger than the outlet, which closes the outlet by being drawn up nearly against its discharging end.

The mechanism here shown may be driven in any convenient way, either directly from the glass shaping machine with which it is employed, or in synchronism therewith by any suitable connecting gearing.

No claim is made herein to apparatus for or a method of feeding molten glass in mold charges by controlling the temperature and viscosity of the glass flowing to and through an outlet to control the formation of suspended mold charge masses below the outlet and severing charges therefrom by shears, or to the use of apparatus for or methods of feeding molten glass in conjunction with a heated chamber below the outlet and mechanical severing means movable into and out of the chamber for severing mold charges from the suspended masses therein, independently of the use of the glass discharge controlling implement projecting through the outlet or means for periodically retarding discharge of glass from the outlet into the heated chamber, as such broad subject matters of invention, together with all novel matters shown in this application and also in my copending prior application, Serial No. 823,694, filed March 10, 1914, for feeding molten glass, are reserved for and are claimed in said prior application, Serial No. 823,694, of which the present application is a continuation in part.

I claim as my invention:—

1. In apparatus for separating molten glass into mold charges, the combination with a container for the glass having a discharge outlet below the surface level of the glass, of shear blades adapted to meet beneath the outlet to sever masses of the glass suspended therebeneath, a gather forming implement guided and adapted for vertical reciprocation through and out of contact with said discharge outlet, the lower end of said implement projecting below said outlet during the entire period of free flow of glass from the outlet, means for reciprocating said implement periodically while out of contact with the outlet, to aid the discharge of glass by its downward movement and retard the discharge by its upward movement, whereby successive suspended masses of the glass will be formed beneath the outlet, and means for periodically operating the shear blades in timed relation to the reciprocations of the implement to sever a mold charge from each suspended mass.

2. Apparatus for feeding molten glass, including a container for the glass having a discharge outlet below the surface level of the glass, a movable implement extending through the glass and beyond the outlet, and mechanism for reciprocating the implement to move its lower end into and out of the discharging side of the outlet.

3. Apparatus for feeding molten glass, including a container having a discharge outlet below the surface level of the glass, an implement extending through the glass and protruding through the outlet, and mechanism for reciprocating the implement to draw it back toward the outlet to assist in forming a mold charge.

4. Apparatus for feeding molten glass, including a container having a discharge outlet below the surface level of the glass, an implement extending through the glass, and protruding through the outlet, and mechanism for reciprocating the implement to draw it back into the outlet to strip off the accumulated gathers from the implement.

5. Apparatus for feeding molten glass, including a container having a discharge outlet below the surface level of the glass, a chamber surrounding the outlet, an implement extending through the outlet into the chamber, and mechanism for reciprocating the implement in the chamber toward and from the outlet.

6. Apparatus for feeding molten glass, including a container having a discharge outlet below the surface level of the glass, a chamber surrounding the outlet, an implement extending through the outlet into the chamber, and mechanism for reciprocating the implement in the chamber, moving it into the chamber to facilitate the flow of the glass, and moving it back into the outlet to check the further flow of glass, and to strip the accumulated glass from the sides of the implement.

7. Apparatus for separating molten glass into mold charges, including a container for the glass having a discharge outlet, means projecting downwardly through and beneath and out of contact with said outlet for supporting, guiding and accumulating in suspended masses the glass discharged from said outlet, and shears beneath the outlet for severing mold charges from the suspended masses.

8. Apparatus for feeding molten glass, including a forehearth provided with a discharge outlet in its bottom, an implement having a head movable vertically through and below said discharge outlet, mechanism for reciprocating said implement, shears movable below said discharge outlet across the path of movement of the head of the implement, and mechanism for reciprocating and opening and closing the shears in timed relation to the movements of the implement, whereby the head and the shears alternately cross each other's paths of movement.

9. The method of segregating and separating a mass of molten glass from a source of supply, which comprises flowing the glass through an orifice and downwardly around the end of an implement projecting below the orifice at all times during the free flow of glass from the latter, accumulating the flow of glass in a depending mass below the implement, arresting further accumulation by arresting the flow of the glass through the orifice and cutting off the accumulation.

10. The method of segregating a mass of molten glass from a source of supply, which comprises flowing the glass through an orifice into a heated chamber around the end of an implement projecting through the orifice, accumulating the glass in a depending mass suspended from the implement, and arresting the flow of glass through the orifice.

11. The method of segregating a mass of molten glass from a source of supply, which comprises flowing the glass from the supply through an orifice into a heated chamber around a gatherer projecting through the orifice into the chamber, accumulating a mass of the glass depending from the gatherer, arresting the flow and stripping the adhering glass from the side of the gatherer by drawing the latter backwardly into the orifice, and severing the accumulated depending mass of glass in the heated chamber.

12. The method of feeding mold charges formed and severed in suspension, which comprises flowing glass downwardly through a constantly open passage formed between portions of a glass container and an implement reciprocating therein and projecting constantly below the passage during the free flow of glass through the passage, causing the glass to accumulate in suspension below the passage, periodically varying the effective size of the passage by movement of the implement to control the discharge of glass through the passage, and severing mold charges from the suspended glass in time relation with the movements of the implement.

13. The method of obtaining mold charges, of molten glass which comprises discharging successive gathers of the glass through a constantly open outlet, suspending each gather from the outlet and from a coacting gathering means projecting constantly below the outlet during the free discharge of glass, retarding the further discharge of glass by the gathering means, and shearing a mold charge from the gather.

14. The combination with a container for molten glass having a discharge outlet, of means for forming and separating the glass into mold charges, including a hot chamber surrounding the outlet, a reciprocating implement adapted to aid and retard the gravity discharge of glass through the outlet into the chamber, to form suspended gathers within the chamber, and severing means movable periodically into and out of the chamber and adapted to sever a mold charge from each gather while in suspension.

15. Apparatus for segregating molten glass, and separating it into mold charges, including a container for the glass having an outlet for the discharge of the glass, a rigid reciprocating implement projecting through the outlet without closing the outlet during the entire duration of discharge of glass for each mold charge to accumulate gathers of the discharged glass suspended in air from its lower end, said implement being movable upwardly periodically to restrict the discharge outlet and means for severing mold charges of the glass from the gathers so accumulated while so suspended.

16. The combination with a container for molten glass having a discharge outlet, of means for forming and separating the molten glass into mold charges and timing the formation of the charges, including a hot chamber surrounding the outlet, means adapted to retard periodically the gravity discharge of glass through the outlet into the chamber to time the formation of gathers within the chamber, and severing means movable periodically into and out of the chamber and adapted to sever a mold charge from each gather as the latter is suspended in the chamber and before it receives any undersupport.

17. The method of separating molten glass into mold charges, which comprises flowing the glass through a submerged outlet, periodically supporting the issued glass by a member projecting through but out of contact with the outlet from above, and severing mold charges from the issued glass while the supporting member is withdrawn into the outlet.

18. Apparatus for separating molten glass into mold charges, comprising a container for the glass having a submerged outlet, means always out of contact with the outlet adapted to be projected below the outlet from above and to be withdrawn upwardly into the outlet, and shears below the outlet adapted to close while the said means are so withdrawn.

19. Apparatus for separating molten glass into mold charges, comprising a container for the glass having a submerged outlet constantly open to permit the movement of glass therethrough, charge-supporting means adapted to be projected below the outlet from above, and to be withdrawn upwardly into the outlet, to form contracted necks on said charges, and shears below the outlet adapted to sever said necks.

20. The method of forming a mold charge of molten glass which comprises feeding glass downwardly from a supply body through an outlet and around an implement protruding through and below the outlet during the entire period of feed of glass through the outlet, accumulating the glass so fed in a depending mass below the outlet, arresting further feed of glass to the said mass by an upward movement of the implement, and severing a mold charge from the depending mass.

21. The method of forming a mold charge of molten glass which comprises feeding the glass downwardly from a supply body through an outlet and around an implement protruding through and below the outlet during the entire period of the feed glass for each mold charge and constantly maintained out of contact with the outlet, accumulating the glass so fed in a depending mass below the outlet, and arresting further feed of glass to the said mass by an upward movement of the implement and severing a mold charge from the depending mass.

22. Apparatus for feeding molten glass, including a forehearth provided with a discharge outlet below the surface level of the glass, an impeller movable through said discharge outlet, mechanism for reciprocating the impeller, a chamber enclosing the outlet, shears movable into and out of said chamber, and means for opening and closing said shears.

Signed at Hartford, Conn., this 1st day of December, 1916.

KARL E. PEILER.